Sept. 10, 1957     T. WILLIAMS     2,805,468

INSERTED BLADE CUTTER

Filed June 16, 1954

Inventor
Thurston Williams
by Roberts, Cushman & Grover
Attys.

United States Patent Office 2,805,468
Patented Sept. 10, 1957

2,805,468

INSERTED BLADE CUTTER

Thurston Williams, Wilton, N. H., assignor to The O. K. Tool Company, Inc., Milford, N. H., a corporation of New Hampshire Application June 16, 1954, Serial No. 437,263

3 Claims. (Cl. 29—105)

In the art of blade holders, for holding a milling cutter or the like in a slot in the end or periphery of a rotary or reciprocatory carrier, it has been proposed to employ a wedge and a screw for wedging the cutter in the slot, but for various reasons the prior constructions have not been satisfactory.

Objects of the present invention are to overcome the disadvantages of the prior constructions and to provide a construction in which the wedge and cutter may be forced either inwardly or outwardly by the screw, in which the wedge may always back up the cutter all the way out to the cutting end of the cutter, and in which the cutter may therefore be thinner and less expensive.

According to the present invention the inner end of the screw is threaded into the body of the carrier and the outer end of the screw has circumferential ridges interfitting complemental grooves in the wedge to force the wedge inwardly when the screw is turned in one direction and to force the screw outwardly when it is turned in the other direction, the abutting faces of the cutter and wedge having interfitting projections and recesses to interlock them against relative movement lengthwise of the screw, whereby the screw moves the wedge and cutter in unison and the wedge may always back up the cutter all the way out to the cutting end of the cutter. Preferably the abutting faces of the wedge and slot have interfitting serrations extending from the mouth of the slot toward the bottom thereof to assist the screw in preventing crosswise movement of the wedge in the slot. In the preferred embodiment the abutting faces of the wedge and body are also interlocked against movement crosswise of the screw and the cutter and wedge abut the front and rear faces of the slot respectively.

For the purpose of illustration typical embodiments of the invention are shown in the accompanying drawings in which.

Figure 1:
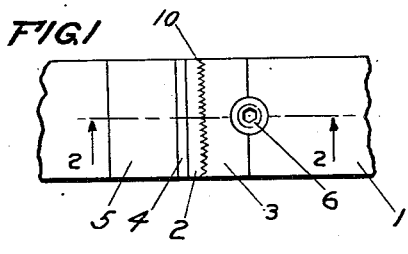
Fig. 1 is a side view of a peripheral cutter.
Figure 5:
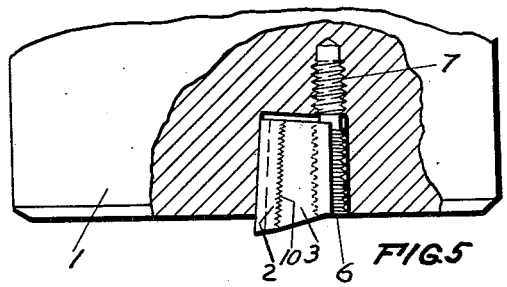
Fig. 5 is a side view of an arrangement for making both peripheral and end cuts.

The particular embodiment of the invention illustrated in Figs. 1 to 4 comprises a rotary body 1 having slots at predetermined intervals in its periphery to receive cutters 2 and wedges 3. Ordinarily the cutters are provided with hardened tips 4 and the body 1 is provided with clearance recesses 5 in advance of the cutters. The wedge 3 may be forced either inwardly or outwardly by means of a screw 6, the inner end 7 of which is threaded into the body 1 and the outer end of which has circumferential ridges 8 which fit in complemental grooves 9 in the rear face of the wedge 3. The rear face of the slot also has a semi-cylindrical recess to fit the outer end of the screw but, instead of having grooves such as 9, this recess is smooth so as to permit endwise movement of the screw relatively to the body.

According to this invention the cutter and wedge are interlocked together by interfitting projections and recesses which prevent relative movement of the parts lengthwise of the screw. For this purpose the interfitting projections and recesses may comprise serrations extending crosswise of the screw. However the cutter and wedge are preferably interlocked together crosswise of the screw as well as lengthwise, in which case the interfitting projections and recesses are preferably pyramidal as shown at 10 in Fig. 4, one part carrying projections and the other part recesses.

Figure 2:
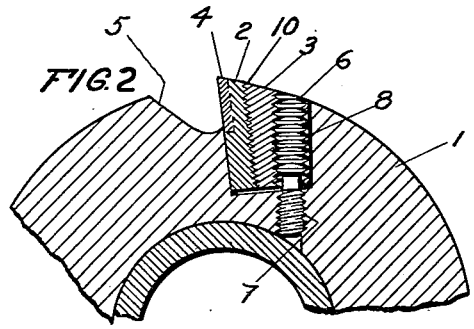
Fig. 2 is a section on line 2—2 of Fig. 1.
Figure 6:
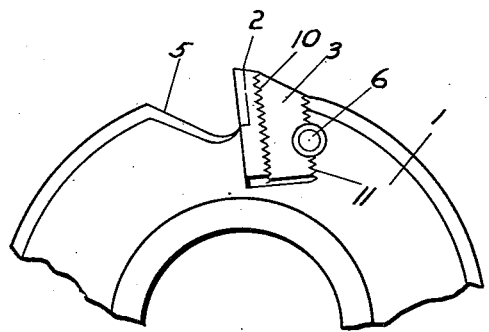
Fig. 6 is an end elevation of the same construction.
Figure 3:
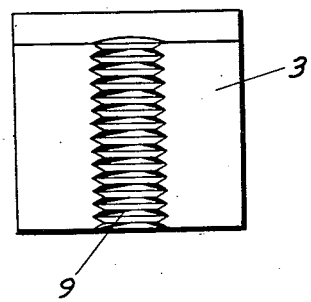
Fig. 3 is an elevation of the rear face of the wedge.
Figure 7:
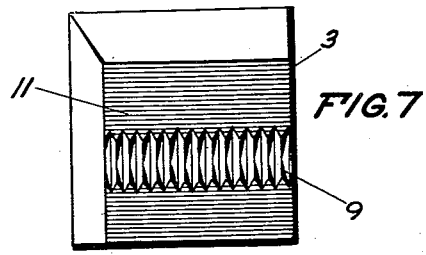
Fig. 7 is an elevation of the rear face of the wedge of Figs. 5 and 6.
Figure 4:
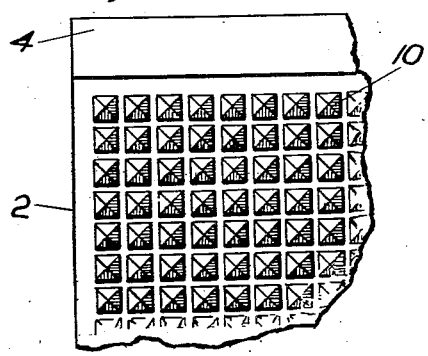
Fig. 4 is an elevation of the rear face of the cutter showing pyramidal projections.
Figure 8:
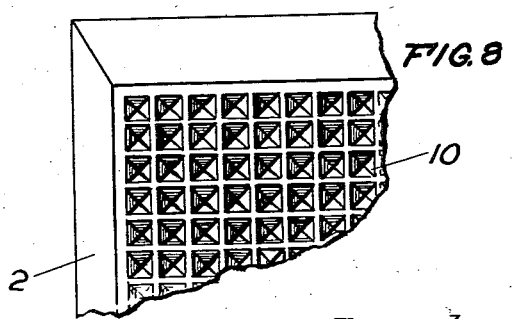
Fig. 8 is an elevation of the rear face of the cutter of Figs. 5 and 6 showing pyramidal recesses.

Before the cutter, wedge and screw are inserted in the carrier they are assembled together in their relative positions shown in Fig. 2, with the outer end of the cutter and wedge substantially flush. Then they are inserted into the slot and the screw is threaded into the socket 7 until the cutter and wedge are tightly wedged between the front and rear faces of the slot. By interlocking the cutter and wedge against relative movement lengthwise of the screw the wedge may back up the cutter all the way to its outer end as shown in Fig. 2. Consequently the cutter can be made thinner than in the usual case and where the wedge moves inwardly relative to the cutter and therefore cannot back up the cutter all the way to the outer end of the cutter in all positions of the parts.

After the cutter has worn enough to require resharpening it can be ground back a distance equal to the width of one of the serrations or pyramids 10 and then, when being reassembled with the wedge 3 its outer end can still be located flush with the outer end of the wedge 3 by shifting the cutter outwardly relative to the wedge a distance equal to the width of a serration or pyramid beyond the position it occupied before being reground. Thus the cutter is always fully backed by the wedge in all positions of the screw, both before and after the cutter is reground.

The embodiment shown in Figs. 5 to 8 is similar to that shown in Figs. 1 to 4 except in that the cutter 2 is an end cutter and the parts are adjustable axially instead of radially of the body 1. Here again the cutter 2 and wedge 3 are interlocked to move together and the cutter is always fully backed by the wedge. When the screw is turned in one direction the cutter and wedge are wedged into the slot and when the screw is turned in the other direction they are pulled out of the slot.

In the embodiment shown in Figs. 5 to 8 the cutter may also have a peripheral cutting edge, in which case it should be interlocked with the wedge both crosswise of the screw as well as lengthwise, as for example by means of the pyramidal projections and recesses 10. When the peripheral edge is resharpened it is ground back the width of one row of pyramids and then when replaced it is shifted outwardly one row so that its outer end is still flush with the outer end of the wedge.

If the tips of all the cutters distributed around the body do not align circumferentially after they are wedged in place, the cutters which project too far are removed and ground back until they all align. At the same time the wedges are ground back correspondingly so that their tips also align circumferentially. Thereafter when a cutter is reground a distance equal to the width of one of the interlocking projections and then replaced in new position advanced outwardly the same distance, it is still backed by the wedge all the way to the tip. By making the cutters uniform in thickness throughout their areas and all the same thickness, a cutter may be replaced with a new cutter without disturbing the aforesaid peripheral alignment and with the wedge still backing up the cutter all the way to the tip.

From the foregoing it will be understood that when the cutter and wedge are interlocked against sidewise movement the screw 6 holds both parts against crosswise movement. However interfitting serrations may be provided on the interengaging faces of the cutter and body or the interengaging faces of the wedge and body on each side of the screw, or in both locations, if it is desired to oppose sidewise movement more effectively, and as indicated at 11 in Figs. 6 and 7 this is desirable where the cutter is adapted to make both end cuts and peripheral cuts simultaneously so that there is a thrust crosswise of the screw.

It should also be understood that the present disclosure is for the purpose of illustration only and this invention includes all modifications and equivalents which fall within the scope of the appended claims.

I claim:

1. In an inserted blade cutter, a body having a slot which tapers toward the bottom, a cutter mounted in the slot, a wedge behind the cutter for holding the cutter in the slot and a screw for forcing the wedge into the slot, the inner end of the screw being threaded into the body and the outer end of the screw having circumferential ridges interfitting complemental grooves in the rear face of the wedge to force the wedge inwardly when the screw is turned in one direction and to force the wedge outwardly when the screw is turned in the other direction, the abutting faces of the cutter and wedge having interfitting projections and recesses to interlock them against relative movement lengthwise of the screw, whereby the screw moves the wedge and cutter in unison and the wedge may always back up the cutter all the way out to the cutting end of the cutter.

2. In an inserted blade cutter, a body having a slot which tapers toward the bottom, a cutter mounted in the slot, a wedge behind the cutter for holding the cutter in the slot and a screw for forcing the wedge into the slot, the inner end of the screw being threaded into the body and the outer end of the screw having circumferential ridges interfitting complemental grooves in the rear face of the wedge to force the wedge inwardly when the screw is turned in one direction and to force the wedge outwardly when the screw is turned in the other direction, the abutting faces of the cutter and wedge having interfitting projections and recesses to interlock them against relative movement lengthwise of the screw, and the abutting faces of the wedge and slot having interfitting serrations extending from the mouth of the slot toward the bottom thereof so that the wedge can slide in and out but not crosswise.

3. The combination of claim 1 further characterized in that the abutting faces of the wedge and body are also interlocked against movement crosswise of the screw.

References Cited in the file of this patent

UNITED STATES PATENTS

| | | |
|---|---|---|
| 1,938,717 | Oxford | Dec. 12, 1933 |
| 2,037,642 | Scribner | Apr. 14, 1936 |
| 2,134,140 | Miller | Oct. 25, 1938 |
| 2,229,112 | Miller | Jan. 21, 1941 |
| 2,309,657 | Miller | Feb. 2, 1943 |
| 2,420,057 | Steffes | May 6, 1947 |
| 2,684,520 | Severson | July 27, 1954 |

FOREIGN PATENTS

| | | |
|---|---|---|
| 798,324 | France | Mar. 2, 1936 |
| 570,452 | Great Britain | Jan. 22, 1945 |